(12) United States Patent
Hobbs et al.

(10) Patent No.: US 8,607,654 B2
(45) Date of Patent: Dec. 17, 2013

(54) PLATFORM FOR SUSPENDED SENSOR STABILIZATION

(75) Inventors: Justin Hobbs, Escondido, CA (US); Daryl Norval, Carlsbad, CA (US); David Drake, Escondido, CA (US); Gregory Quist, Escondido, CA (US)

(73) Assignee: Hadronex, Inc., Escondido, CA (US)

( * ) Notice: Subject to any disclaimer, the term of this patent is extended or adjusted under 35 U.S.C. 154(b) by 87 days.

(21) Appl. No.: 13/277,184

(22) Filed: Oct. 19, 2011

(65) Prior Publication Data

US 2013/0098178 A1    Apr. 25, 2013

(51) Int. Cl.
*G01D 21/00* (2006.01)

(52) U.S. Cl.
USPC ........................................... 73/865.8

(58) Field of Classification Search
None
See application file for complete search history.

(56) References Cited

U.S. PATENT DOCUMENTS

| | | | | | |
|---|---|---|---|---|---|
| 3,360,141 | A | * | 12/1967 | Martin | 414/572 |
| 3,377,868 | A | * | 4/1968 | Dowling et al. | 73/864.61 |
| 3,950,999 | A | * | 4/1976 | Edwards | 73/864.62 |
| 4,019,380 | A | * | 4/1977 | Raymond | 73/864.42 |

* cited by examiner

*Primary Examiner* — Robert R Raevis
(74) *Attorney, Agent, or Firm* — Techlaw LLP; Jonathan A. Kidney

(57) ABSTRACT

A sensor stabilization platform and method for installation in an enclosure is described, wherein the platform can be lowered into the enclosure from the enclosure's entry way (without requiring a person to enter the enclosure) and properly oriented to provide the structural support/securing capabilities needed for a sensor that is "sensing" the material at the bottom of the enclosure. The securing platform is weighted or configured to rest (without movement) at the bottom of the enclosure floor or manhole, and sensors can be lowered into the platform's receptacle(s), etc. The platform may be configured to be foldable, allowing it to be compact and pass through narrow entry ways.

12 Claims, 10 Drawing Sheets

PLATFORM FOR SUSPENDED SENSOR STABILIZATION

FIELD

This invention relates to stabilization of sensors inside enclosures.

BACKGROUND

Management and maintenance of sensor systems in closed enclosures requires strict adherence to safety protocols to avoid injury of the servicing technician when ingressing/egressing the enclosure. Particularly, in sanitation and waste water systems (i.e., sewer systems), the risks for injury have risen as more enclosures such as manholes are becoming retrofitted with automated systems for sewer "health" and "hazard" monitoring. These retrofitting/maintenance calls often require the technician to not only enter the enclosure (e.g., manhole) but also spend a significant amount of time at the bottom of the manhole. Once entry is required (whether for a sensored or unsensored manhole), a significant amount of safety equipment is necessitated to prevent a fall and/or injury of the technician, increasing the capital costs for these service events. Additionally, increasing insurance and compensation for resulting injuries have added to the escalation of costs, not to mention the loss of skilled manpower.

What would be desired in this and other related industries, is a method and/or system that obviates the need (or at least minimizes it) for a technician to enter into the enclosure while still accomplishing his service tasks. Such methods and systems are described in the following disclosure.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In various aspects of the disclosure, a sensor stabilization platform for placement at the bottom of a vertical enclosure is provided, comprising: a plurality of substantially vertical leg members; substantially horizontal support members, at least one of the support members coupled to a top portion of the leg members, wherein the support members form an upper portion of the platform, the plurality of leg members forming an opening beneath the upper portion of the platform; a receptacle coupled to the upper portion of the platform, having a securing mechanism to secure a sensor inserted into the receptacle, the receptacle configured to allow the inserted sensor to operate without interference from the receptacle; at least one height adjuster coupled to at least one of the plurality of leg members, allowing leveling of the upper portion of the platform; and a ballast attached to the platform to prevent movement of the platform when finally resting at the bottom of the vertical enclosure, wherein the platform is constructed from an environmentally resistant material.

In another aspect of the disclosure, a sensor stabilization platform for placement at the bottom of a vertical enclosure is provided, comprising: a receptacle with a securing mechanism to secure a sensor inserted into the receptacle, the receptacle configured to allow the inserted sensor to operate without interference from the receptacle; a plurality of substantially vertical leg members, at least a top portion of one of the plurality of leg members being coupled to the receptacle supporting the receptacle, the plurality of leg members forming an opening beneath the receptacle; at least one height adjuster coupled to at least one of the plurality of leg members, allowing leveling of the platform; and a ballast attached to the platform to prevent movement of the platform when finally resting at the bottom of the vertical enclosure, wherein the platform is constructed from an environmentally resistant material.

In yet another aspect of the disclosure, a method of measuring a feature to be observed in an exposed channel at the bottom of an enclosure, the method comprising: lowering a sensor stabilization structure through an entry way of an enclosure is provided, wherein the sensor stabilization structure comprises: a plurality of substantially vertical leg members; substantially horizontal support members, at least one of the support members coupled to a top portion of the leg members, wherein the support members form an upper portion of the platform, the plurality of leg members forming an opening beneath the upper portion of the platform; a receptacle coupled to the upper portion of the platform, having a securing mechanism to secure a sensor inserted into the receptacle, the receptacle configured to allow the inserted sensor to operate without interference from the receptacle; at least one height adjuster coupled to at least one of the plurality of leg members, allowing leveling of the upper portion of the platform; and a weight attached to the platform; resting the sensor stabilization structure at the bottom of the enclosure; and adjusting the sensor stabilization structure to have the receptacle to be above the exposed channel.

These and various other aspects of features of the invention are provided in the Detailed Description.

DETAILED DESCRIPTION

Using a manhole enclosure as one of many possible enclosure paradigms, various exemplary methods and systems are described herein, wherein sensor(s) that are situated inside the enclosure (which may be wirelessly communicated with, or tethered or suspended from the enclosure cover or a top wall of the enclosure, as possible non-limiting examples) are secured inside the enclosure. In various exemplary embodiments, the securing mechanism is a supporting platform that can be lowered into the enclosure and properly oriented to provide the structural support/securing capabilities needed for the sensors. The sensors may be placed within the securing platform either before or after deployment of the securing platform. In various embodiments, the securing platform can be situated to rest at the bottom of the enclosure floor. In various other embodiments, the securing platform can be situated to rest against a wall of the enclosure.

Depending on the size of the enclosure's entry way, the exemplary embodiments may "collapse" into a smaller shape, allowing the exemplary embodiments to pass thorough the entry way, and thereafter "expand" into its final size/shape when in the larger area of the enclosure. That is, various exemplary embodiments can be designed to self-assemble into a larger/final shape once they are through the entry way.

With the use of these exemplary securing platforms, physical entry of the enclosure is not required and also a self-supporting mechanism for housing sensors can be placed into the enclosure without the requirement to "attach" the sensors to a side wall of the enclosure, or other part of the enclosure.

It is expressly understood that while the various embodiments shown below are illustrated and described in the context of a manhole enclosure, the principles described herein may be applied to other types of enclosures that suffer similar types of problems. Accordingly, the exemplary embodiments may be utilized in enclosures that are not manholes and, where necessary, the exemplary embodiments may be appropriately modified within the capabilities of one of ordinary skill in the art, without departing from the spirit of this disclosure. Of particular interest for applicability would be gas and oil enclosures, where physical entry can be life-threatening.

Figure 1:
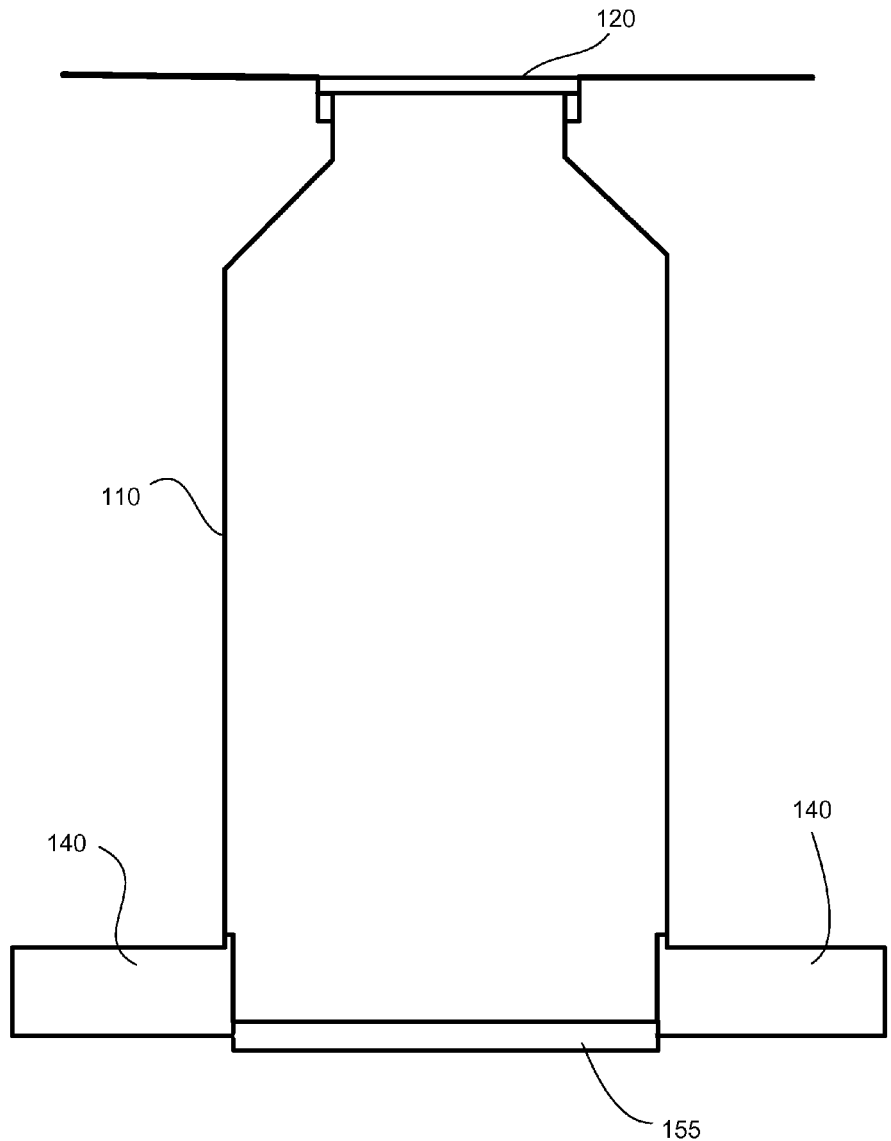
FIG. 1 a cross-sectional illustration of a closed enclosure (typical manhole).

FIG. 1 a cross-sectional illustration of a closed enclosure, represented in this FIG. as a typical manhole 100 with side walls 110, manhole cover 120, lines 140 and bottom section 155. Not evident from this perspective, bottom section 155 is usually comprised of an "invert" which is an open (often V-shaped or U-shaped) channel at the bottom of the manhole, allowing physical inspection of the fluid traveling through lines 140. Typically, in sewer systems, the invert's width ranges around 4 inches to 12 inches. However, in some systems, it is possible for the invert to be several feet wide (even six feet or more, depending on the design of the sewer). The "exposed" fluid in the invert allows for measurements to be made, inspection to be performed and other data-gathering activities, with respect to the fluid and also the flow rate (or volume) of the fluid. Inverts and the configuration of manholes (whose depth may range from eighteen inches to forty-five feet) are understood to be self-explanatory to one of ordinary skill in the art.

Figure 2:
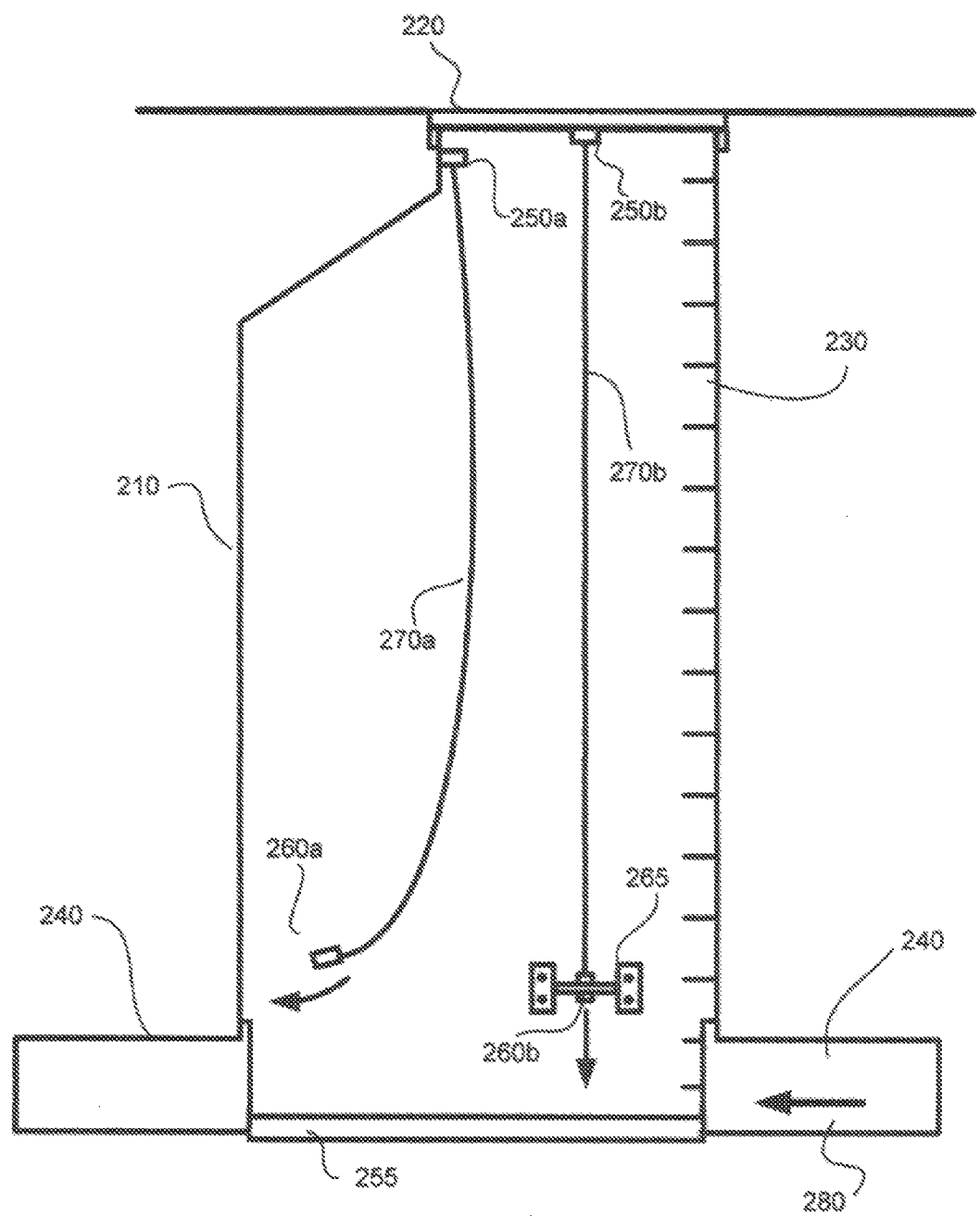
FIG. 2 is a cross-sectional illustration of a related art manhole with sensors.

FIG. 2 is a cross-sectional illustration 200 of another manhole showing steps 230, pipes 240 and two deployed sensors 260a, 260b, in accordance with the related art. The sensors 260a, 260b are tethered via lines 270a, 270b to attachment/control boxes 250a, 250b, respectively, and are used to examine the fluid 280 traveling through pipes 240, as exposed in the bottom section 255 (i.e., invert). The position of box 250b is distinguished from box 250a in that it is attached to the underside of manhole 220, while box 250a is attached to a portion of side wall 210. It is noted that sensor 260a is suspended solely using tension in line 270a above bottom section 255; and as a consequence of air currents or other disturbances in the manhole, is subject to swaying or displacement from its optimal position, as indicated by the accompanying arrow.

In contrast, sensor 260b is secured from movement via a securing bracket 265 that is attached to the manhole wall, maintaining its preferred orientation and position, as indicated by the accompanying arrow. While the arrangement of sensor 260b is considered an improvement over the arrangement of sensor 260a, this requires a technician to physically enter the manhole and attach the securing bracket 265 to the manhole wall. Typically, such attachment schemes require drilling into the walls and bolting the securing bracket 265, all of which entail significant machinery, and are time-consuming tasks, as well introducing the possibility of the ignition of flammable gases that may be present in the manhole. As discussed above, the related art approach exposes the technician to in-enclosure hazards. Not to mention, several brackets 265 (and concomitant drilling) may be necessary for a multiply-sensored manhole, which "damages" the side walls 210 of the manhole. Therefore, whether the manhole is thirty feet deep or only eighteen inches deep, a significant amount of effort is required.

Figure 3:
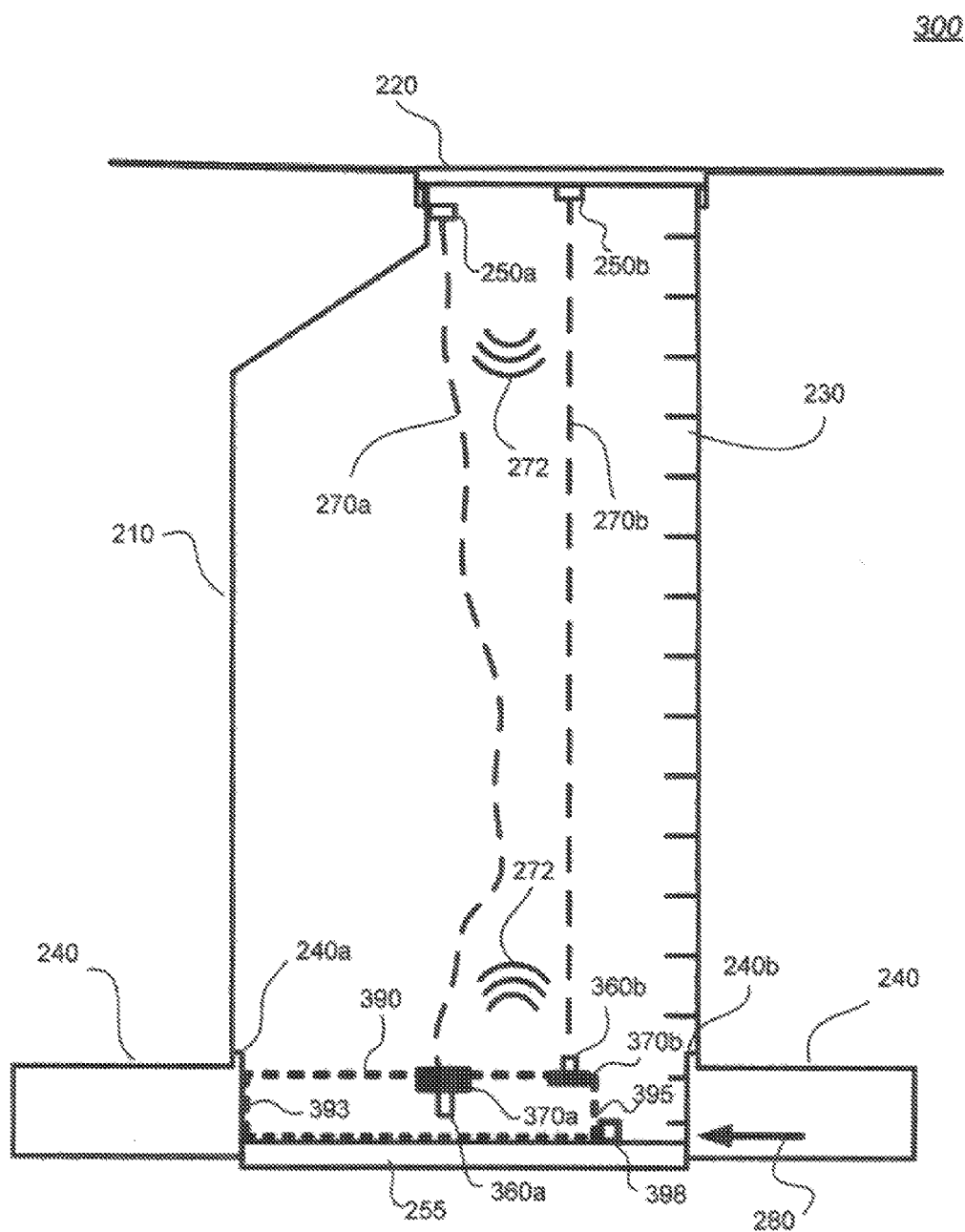
FIG. 3 is a cross-sectional illustration an exemplary platform in a deployed configuration.

FIG. 3 is a cross-sectional illustration 300 of an exemplary system for avoiding some of the deficiencies noted in the description of FIG. 2. Specifically, a sensor supporting platform 390 is lowered to bottom section 255, which provides a mechanism for sensors 360a, 360b to be affixed to or secured to. Depending on the mode of communication utilized, sensors 360a, 360b may communicate wirelessly 272 with attachment/control boxes 250a, 250b. The exemplary platform 390 can be ballasted in a manner to avoid movement from air and/or water currents and can be designed to "sit over" the bottom section 255 (e.g., invert) without interfering with fluid 280 moving between pipes 240, under normal conditions.

FIG. 3 illustrates a configuration view of exemplary platform 390, that is, in a deployed state. Sensors 360a, 360b can, either prior to deployment or after deployment, be attached, mounted, or secured to exemplary platform 390 via securing mounts 370a, 370b which can be part of the exemplary platform 390. If the exemplary platform 390, in a deployed state, is configured to be smaller than the width of the bottom of the manhole, then one side 393 of exemplary platform 390 can be situated against a side 240a of the manhole/pipe, thus being prevented from movement, particularly in the lateral direction of the flow of liquid 280 from pipes 240. A non-contacting side 395 of the exemplary platform 390 may be positioned toward but displaced from side 240b of the manhole, shown in this example to be near steps 230. Accordingly, some room at the bottom section 255 can be provided for a technician, if necessary.

It is noted that while the exemplary platform 390 is illustrated in FIG. 3 as being positioned parallel with pipes 240, it may be positioned at an angle or perpendicular to pipes 240, being configured for such an arrangement. In some instances, the exemplary platform 390 may "fill up" against the sides of the manhole—touching or bordering sides 240a, 240b of the manhole, or may be designed in such a manner that the center of the exemplary platform 390 is open. Therefore, in various embodiments, the exemplary platform 390 can be situated toward or away from either sides (240a, 240b), depending on the configuration chosen. As is apparent, various modifications may be contemplated to the design shown by one of ordinary skill in the art without departing from the spirit and scope of this disclosure.

As mentioned above, some form of ballast or weighting: non-limiting examples being, sand, concrete, stone, metal, and so forth, may be utilized in or attached to the exemplary platform 390 to cause the exemplary platform 390 to be difficult to slide or displaced when situated on the bottom section 255. To avoid displacement in a sewer implementation, weights of 5 lbs or more may be utilized in exemplary platform 390.

When designed for sewer installations, the exemplary platform 390 should be manufactured of an environmentally resistant material, to be able to survive long exposures to humidity, water, gases, and other hardships in the sewer. Long exposures are understood to be least two to three years minimum. Polyvinyl chloride (or commonly known as PVC) is an excellent material, being inexpensive, strong, and tolerant of water, and was used in fabricating several experimental models. While PVC may be utilized, it is, of course, understood that other materials that exhibit environmental robustness may be used, such as, for example, aluminum, rubber, plastic, carbon fiber, and so forth.

In some instances, the exemplary platform 390 may be comprised of hollow pipes, such as PVC or other environmentally resistant materials, wherein certain of the hollow spaces may be filled with the ballasting material. In other embodiments, the exemplary platform 390 may be secured from lateral or side movement (and/or vertical movement) by "wedging" an exposed section of the exemplary platform 390 against a side of the pipe 240 (pipe lip, for example), or against steps 230. In these instances, the exposed section of the exemplary platform 390 may be purposely designed to facilitate the wedging function (for example, a hooking tongue or clip, and so forth). In some instances, the invert (not shown) may have a lip or other feature that assists in allowing the exemplary platform 390 to be "wedged" or "pinned" to the invert's feature. In other embodiments, the exemplary platform 390 may be "pinned" against a wall 240a by a separately lowered external ballast 398 that is positioned against a side 395 of the exemplary platform 390. Of course, the external ballast 398 may be positioned against any portion of the exemplary platform 390, according to design preference.

As is apparent from the above description, the ballasting scheme can be achieved by any one or more different ways, including but not limited to the ways described above. Accordingly, it is expressly understood that given the objective to secure the exemplary platform 390 from movement (or to keep it stabilized), various modifications and changes may be made without departing from the spirit and scope of this disclosure.

Figure 4:
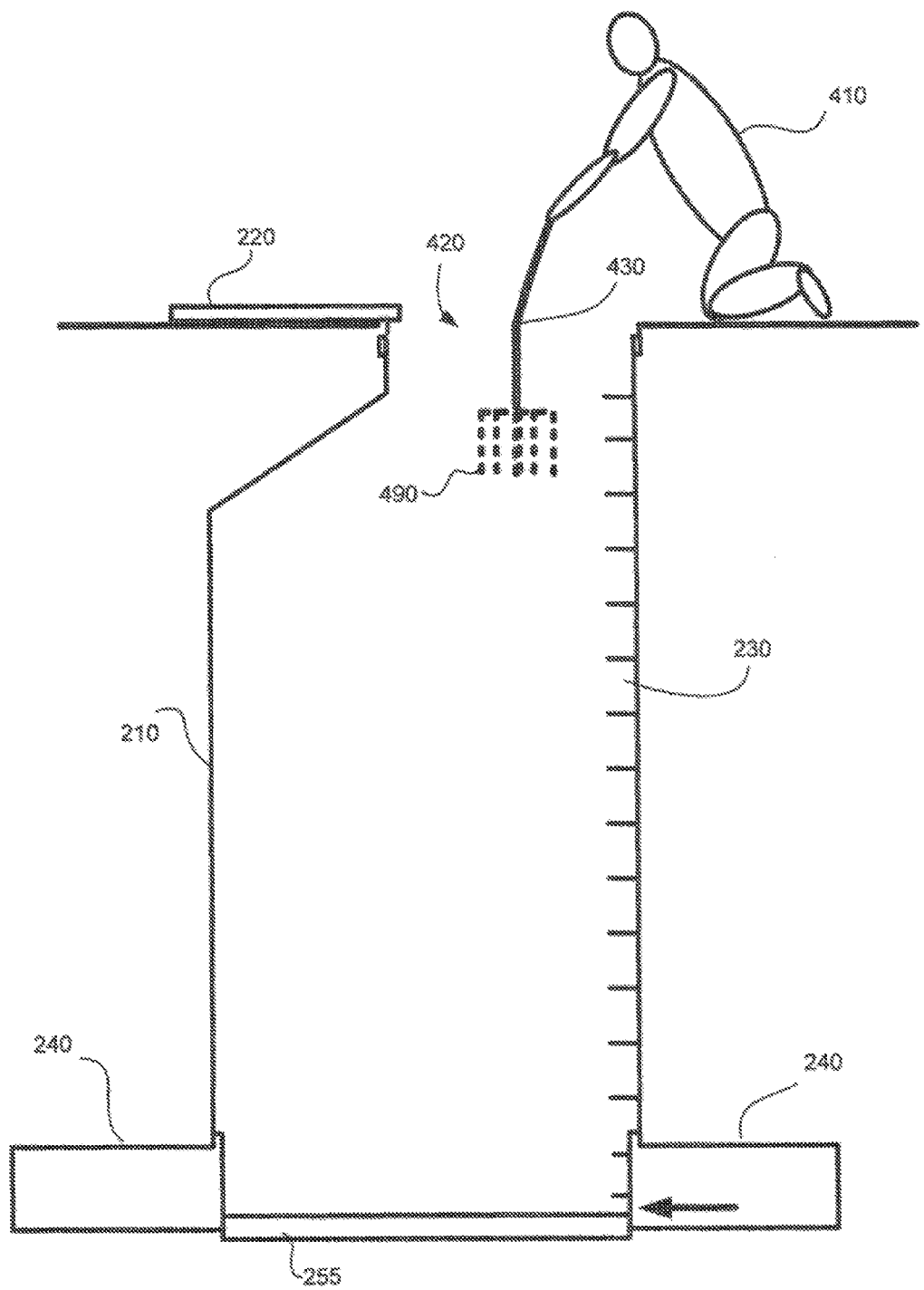
FIG. 4 is an illustration of an exemplary platform in a folded or compact configuration in a manhole.

FIG. 4 is an illustration of an exemplary platform 490 configured to be "self-assembling" in its compact form, that is being lowered thorough an open manhole opening 420 to the bottom section 255 of manhole, using a supporting cable 430 by technician 410 (or proxy thereto—may be lowered by a machine or mechanical means, for example). As mentioned above, in some circumstances, the manhole opening 420 may be too small to allow a "fixed frame" exemplary platform to be passed through the manhole opening 420. In these cases, a foldable or configurable exemplary platform 490 is utilized which has a smaller "folded" size than a deployed or unfolded size. Details of this exemplary embodiment 490 will be provided below.

Figure 5:
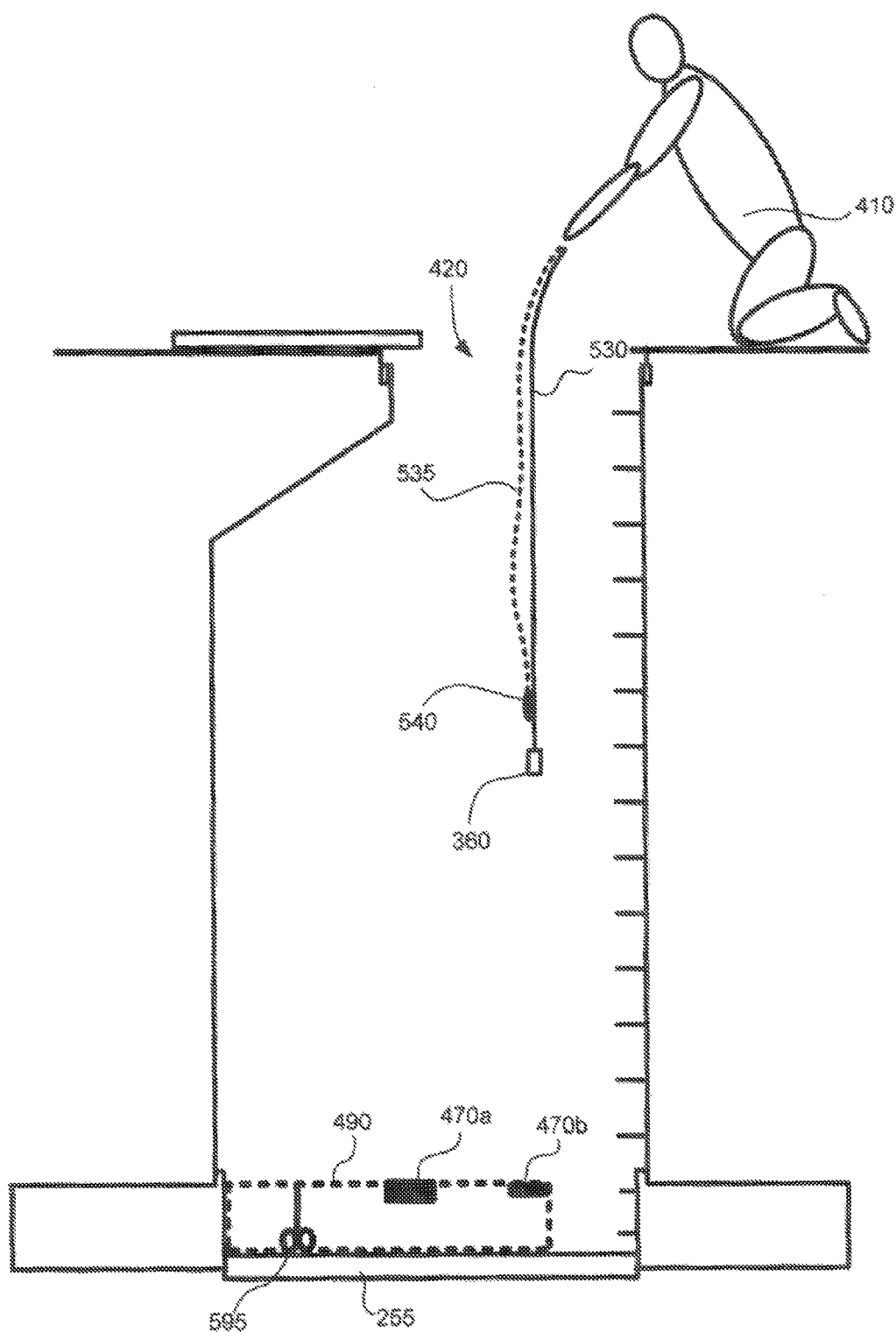
FIG. 5 is an illustration of a sensor being lowered into a deployed exemplary platform.

FIG. 5 is an illustration of a technician 410 (or proxy thereto) lowering a sensor 360 into sensor receptacles 470a or 470b which are attached to a deployed exemplary platform 490. Sensor 360 is shown attached to communications cable 530 with a removably coupled temporary ballast 540. Temporary ballast 540 can be used to "weigh down" the sensor 360 to help in its descent, and may be removed via attached secondary cable 535. In some instances, the temporary ballast 540 may be donut-like shaped, sliding over cable 530 and then lifted up after sensor 360 is secured to the exemplary platform 490. In other instances, temporary ballast 540 may be "clipped" or "taped" to cable 530 (or to sensor 360 or the sensor's housing) and removed in an appropriate manner. Of course, numerous other methods and schemes for weighing down sensor 360 may be utilized according to design preference. Therefore, modifications and changes to how sensor 360 is temporarily ballasted may be made without departing from the spirit and scope of this disclosure. For example, a magnetic form of "latching" and "unlatching" may be utilized, or a liquid filled container that is designed to leak ballast (e.g., water), thus dispelling its ballast after deployment.

FIG. 5 also shows an optional device 595 that is attached to the exemplary platform 490, protruding from the top of the exemplary platform 490. The device 595 can be a power generation device, providing power for the sensors and potentially the supporting electronics and communications—not shown—that the sensors "may" be tethered to (noting that wireless communication may be one available mode of communication for the sensors). The power generation device 595 could be suspended from the exemplary platform 490 or embedded into the exemplary platform 490. For example, depending on the mode of power generation utilized, the power generation device 595 could be situated at the "feet" of the exemplary platform 490, or above the exemplary platform 490. Wind/water currents could be harvested for energy, temperature variances, fluid flow, and other possible mechanical or thermionic or other energy generation schemes could be utilized, now being supported (and potentially protected) by exemplary platform 490.

It should be apparent that while the power generation device 595 can be separately situated in the exemplary platform 490, it may be possible (depending on design) to have the power generation device 595 fit within a sensor receptacle 470a, 470b. Therefore, the power generation device 595 could be lowered down separately from the exemplary platform 490 and "plugged" into the exemplary platform 490 in a similar manner (if so designed) as to that of sensor(s) 360.

In continuance of the possibilities afforded by the use of an exemplary platform 490, sensors, power generation devices, and so forth, could have their cabling "strapped" to the exemplary platform 490, to avoid the cabling from falling down into the invert. Therefore, the exemplary platform 490 can operate also to provide a framework for securing cabling.

Evident in FIGS. 4 and 5 is the fact that technician 410 does need to enter into the manhole to accomplish his servicing goal. Accordingly, many if not all of the injury concerns with related art approaches to sensor placement into the bottom of manholes (or enclosures) can be avoided. Since there is now no need to drill holes into the side of the manhole for a securing bracket, a significant amount of time (and cost) can be saved in a service call, since the lowering of the exemplary platform 490 and subsequent lowering of the respective sensors 360 can be rapidly performed.

Additionally, if the exemplary platforms 490 are manufactured with an inexpensive material (for example, PVC pipes) and filled with an inexpensive ballast (for example, sand), the cost savings in materials, shipping, and time and as well as the reduced potential for injuries can be very significant, especially in the sewer industry. Of course, the exemplary methods and apparatuses can be applied to other industries that require physical entry into a dangerous enclosure. Non-limiting examples of such industries being the electrical, oil and gas industries.

Figure 6:
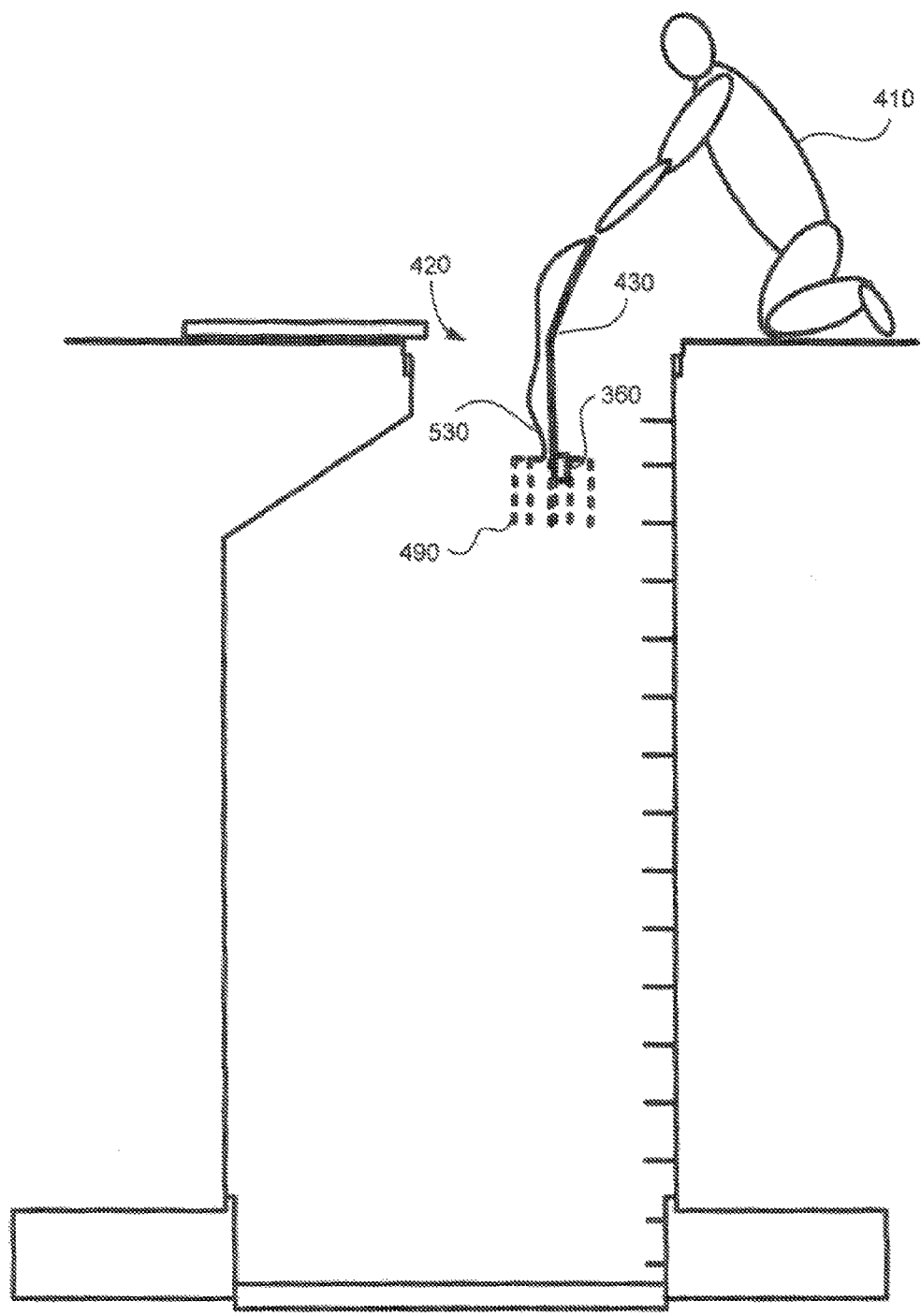
FIG. 6 is an illustration of a technician lowering a "combination" exemplary platform.

FIG. 6 is an illustration of a technician 410 lowering a "combination" exemplary platform 490, in a compact configuration, for example, that has within it sensor 360 (and/or power generation device, or a non-sensor device, for that matter) already affixed. Sensor 360 is coupled to communication cable 530, while exemplary platform 490 is coupled to removable cable 430. In this scenario, the operations described in FIGS. 4-5 can be combined into a single descent operation, thus reducing the amount of time needed for sensor deployment. Accordingly, the approach of FIG. 6 may be operationally more efficient than the approach of FIGS. 4-5.

As may be apparent, the exemplary platform 490 may only need to be in a compact or folded form when first dropped through the restricted manhole opening 420, the reduced size being desirable only for easy passage through the manhole opening 420. Therefore, while FIGS. 4-6 illustrate the exemplary platform 490 as being in a compact or folded form while being inside the manhole, it is understood that the exemplary platform 490 may be in a fully deployed or unfolded mode after entry but during its descent inside the manhole. Of course, as noted in FIG. 3, the exemplary platform 490 may be of a configuration that is "fixed" with respect to its shape and may be lowered into the manhole (size permitting) in its fixed shape.

Depending on the type of implementation and design utilized, the exemplary platform 490 may require an "unfolding" mechanism that is controllably triggered by the technician 410. A latch, reorienting the exemplary platform 490 (allowing gravity, for example, to unfold), twisting, a plurality of cables, and various other forms of control/triggering for unfoldment or expansion may be utilized according to design preference. In some instances, the exemplary platform 490 can be designed to be mechanically opened or opened after coming to rest at the bottom of the manhole.

In one experimental model, the exemplary platform 490 (having a folding configuration) was designed to be unfolded by gravity, being unfolded when oriented in a particular direction. The exemplary platform 490 was held in its folded form by simply clasping hand(s) around one end of the platform 490 and releasing it as it passed through the manhole opening 420, resulting in the exemplary platform 490 naturally unfolding itself while in the manhole. A simple forcing mechanism could be used to assist in the opening, non-limiting examples being a spring or rubber line that forces the exemplary platform 490 to open when released. As noted above, numerous folding/unlatching/etc. approaches are available to one of ordinary skill in the art, the above example only illustrating one of many possible approaches.

Figure 7A:
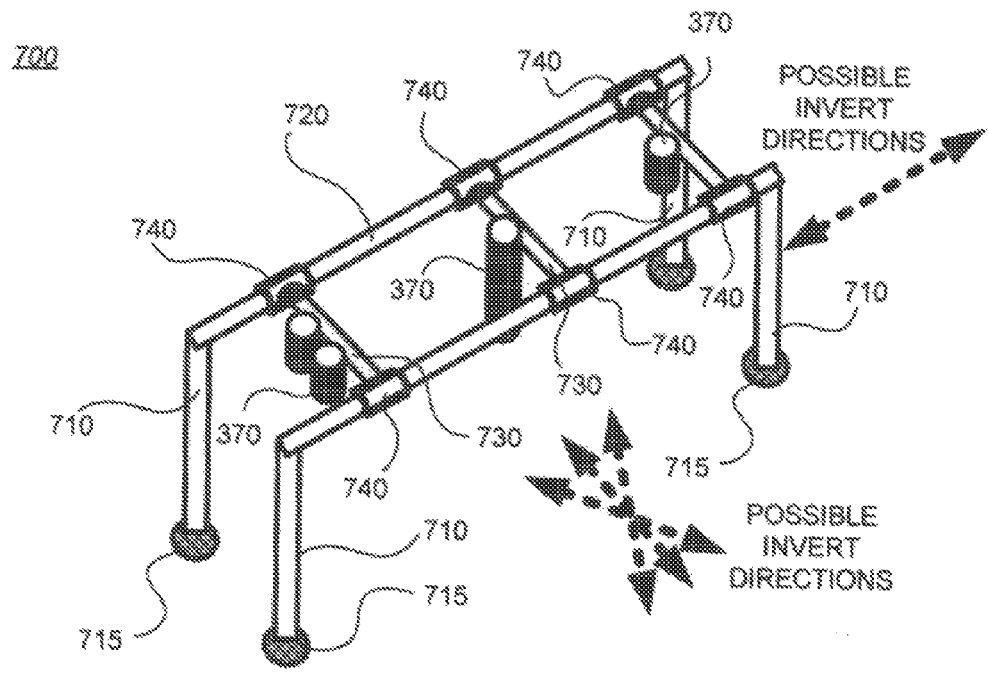
FIGS. 7A-B are perspective illustrations of two exemplary platforms.
Figure 7B:
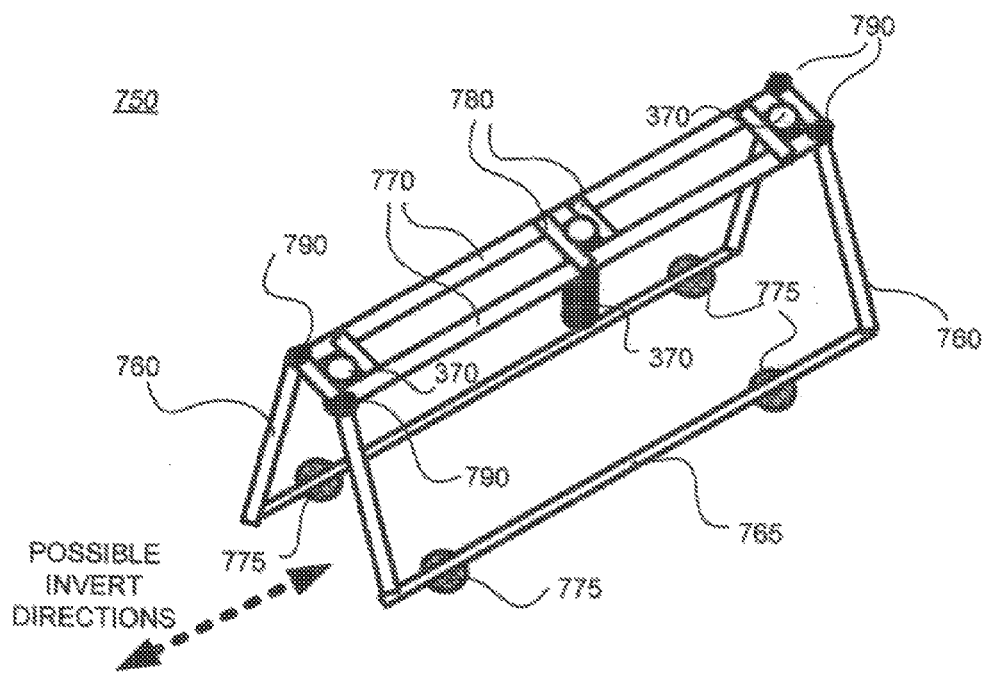

FIGS. 7A-B are perspective illustrations of exemplary platforms. In FIG. 7A, the exemplary platform 700 comprises supporting legs 710 that are coupled to longitudinal members 720 that elevate sensor receptacles 370 from the bottom of the exemplary platform. Sensor receptacles 370 are attached to cross members 730 which are attached via connection 740 to longitudinal members 720. The sensor receptacles 370 are situated to provide clear access to whatever effluent or fluid is traveling in the enclosure, being elevated to avoid contact, if possible. Generally, more than several inches of separation is desired when attempting to protect a sensor from contact. For example, a typical sewer-type ultra-sonic sensor should be placed at least one foot to one and a half foot away from the measured liquid. Therefore, in this instance, the bottom of sensor receptacles 370 should be elevated this distance from the manhole floor (or invert). Accordingly, supporting legs 710, for this sensor, should have a height that is commensurate to achieve this separation. It is understood, however, that in some instances, the sensor may require actual contact, therefore the supporting legs 710 and sensor receptacles' 370 heights can be adjusted, as needed.

Continuing with FIG. 7A, in one embodiment, the connection 740 can be fixed to the longitudinal members 720—thus, generating a non-folding or non-expanding platform structure. In an embodiment designed to be flexible/foldable, the connection 740 can be formed (from a hollow PVC sleeve, for example) which is allowed to freely rotate about the longitudinal member 720 (to within a fixed orientation so as to provide support), rather than be fixed to longitudinal member 720. In this foldable embodiment, the exterior of the hollow sleeve is attached to cross members 730.

The open areas under the exemplary platform 700 enable it to "fit" over an invert (not shown), as illustrated by the dashed arrows, without interfering with fluid flowing through the invert.

While FIG. 7A illustrates attachments 740, for a foldable embodiment, that appear as hollow rotatable sleeves, it is expressly understood that other forms of flexible or mechanisms for "expanding" may be utilized as within the purview of one of ordinary skill in the art, such as various pivoting mechanisms or expandable arms or sliding extensions, and so forth may be used, as according to design preference. Therefore, modifications to the type and form of flexibility may be made to the attachment mechanism 740 without departing from the spirit and scope of this disclosure.

It is noted that FIG. 7A shows the sensor receptacles 370 attached to cross members 730. In some embodiments, the sensor receptacles 370 may be attached to longitudinal members 720 or even to the legs 710 (or to manhole ledge or other feature—not shown). To allow some form of "leveling," the exemplary embodiment 700 shown in FIG. 7A includes optional leveling feet 715 disposed at the bottom of legs 710, which can be adjusted in height to provide a levelness to the exemplary platform 700 over an uneven surface. Of course, the leveling feet 715 may be situated not at the "feet" but higher up on supporting legs 710, as according to design preference. The purpose of providing the optional ability to "level" the exemplary platform 490 is to provide a fixed and secure position for a sensor (not shown) so that the sensor can be best positioned for its operation.

For example, if using a ultra-sonic ranging sensor, the sensor should be pointed directly downward, substantially perpendicular to the manhole floor or invert containing the fluid to be measured. With a fixed distance and fixed orientation, the sensor can be assured to perform accurately.

FIG. 7B is an illustration of another exemplary platform 750 with legs 760 canted outward and having lower longitudinal members 765 at the bottom of legs 760; upper longitudinal members 770 at a top of legs 760, wherein the upper longitudinal members 770 provide support for cross members 780. The cross members 780, in addition to providing lateral stability, provide an easy attachment mechanism for sensor receptacles 370. Presuming a foldable configuration, pivoting or rotating points 790 are shown at junctions formed between upper longitudinal member 770 and upper portion of legs 760, and leveling feet 775 are shown as being positioned on lower longitudinal members 765. It is noted that for a non-folding embodiment, the pivoting or rotating points 790 may be replaced with a fixed attachment scheme.

Figure 8A:
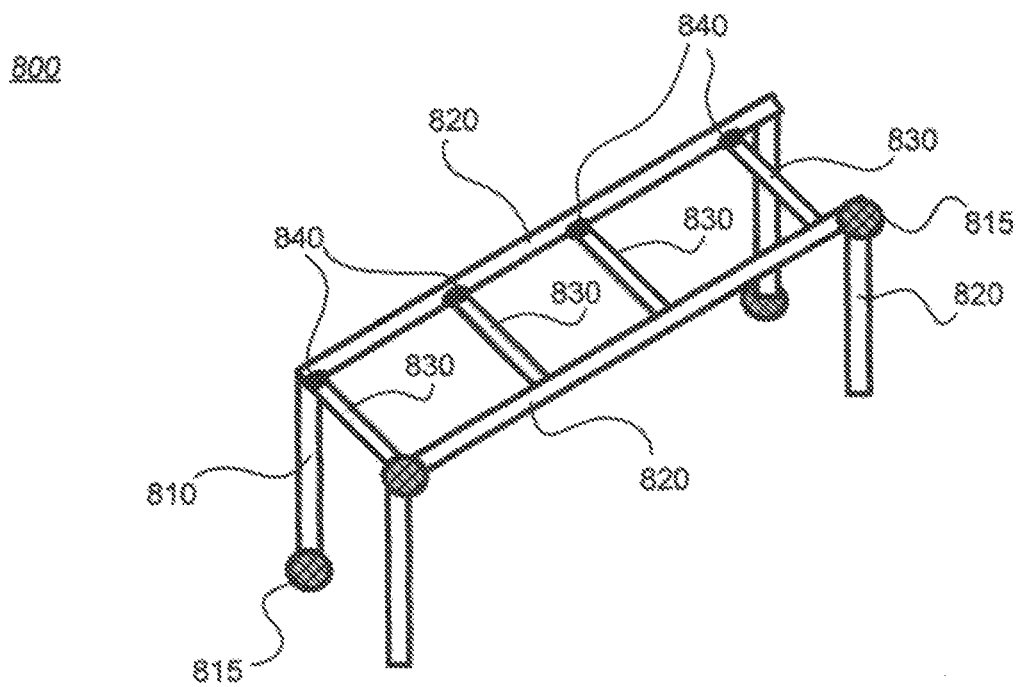
FIGS. 8A-B are perspective illustrations of other exemplary platforms.
Figure 8B:
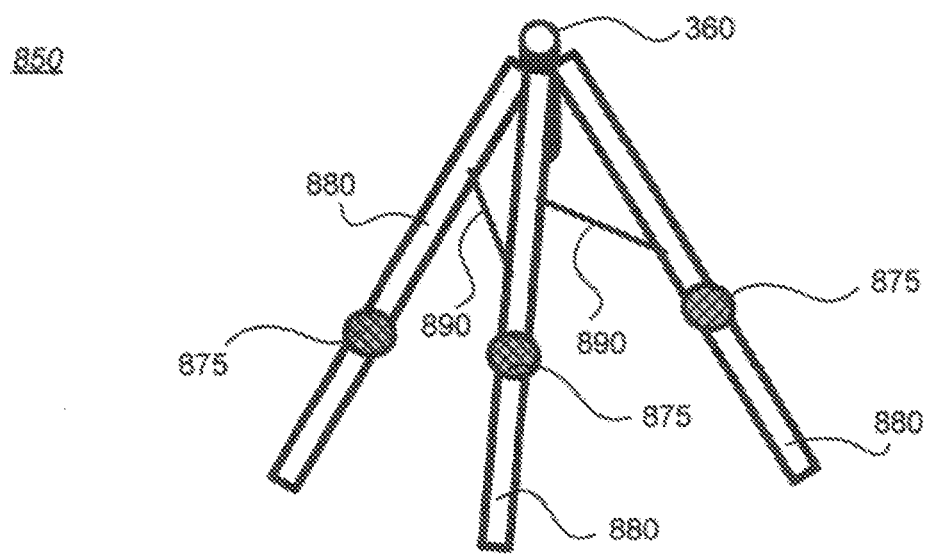

FIGS. 8A-B are perspective illustrations of other exemplary embodiments. FIG. 8A illustrates an exemplary embodiment 800 without sensor receptacles built into the platform. Legs 810 with leveling "feet" 815 on one side and leveling "non-feet" on the other side are coupled via swinging (or pivoting, sliding, and so forth) elements 840 to longitudinal member 820. Cross members 830 are connected to form open rectangular "trays" that a sensor receptacle can be attached to—in this instance, a module of sensors or tray of sensors/receptacles (see FIG. 10C, for example) can be placed into any one of the three open areas formed at the top of the exemplary platform. This particular embodiment allows for flexibility of the final configuration of the exemplary platform.

FIG. 8B illustrates a tripod-like platform 850 with a sensor receptacle 360 at the apex. Legs 880 may have (optionally) leveling features 875 which may allow portions of the legs 880 to rise up or down (or bend outward/inward) and are opened up by movable arms 890 which can be manually opened up. However, movable arms 890 may be replaced with springs that can operate to automatically open the legs 880 when released. While FIGS. 8A-B describe the exemplary embodiments 800, 850, respectively, as having the capability to "expand" or fold out, etc., it is understood that an embodiment can be designed that does not expand or fold out, if the enclosure it is being used for has a sufficiently wide enough entry.

Given the above description, it should be appreciated that the exemplary platforms may be customizable. It may be several inches in height or may be several feet or more in height. It may be an all-inclusive platform, having specifically designed receptacles for a given sensor—being configured for a specific "mission" or type of enclosure, or may be of a modular configuration, allowing various receptacles "trays" to be mixed and matched within the platform, allowing a given platform to provide supporting/structural services to any number of different types of sensors, etc. Since, in some embodiments, the exemplary platform can expand, it can be designed to have origami-like structures that can fold or expand outward when lowered into the enclosure, with some modes of expansion being necessary or unnecessary. For example, a given platform may "telescope" to a variety of sizes; and for a given manhole, it may not be necessary to fully extend the platform for it to serve its purpose.

Figure 9A:
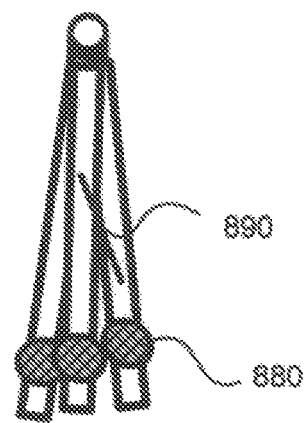
FIGS. 9A-B are illustrations of a compact/closed appearance of various exemplary platforms.
Figure 9B:
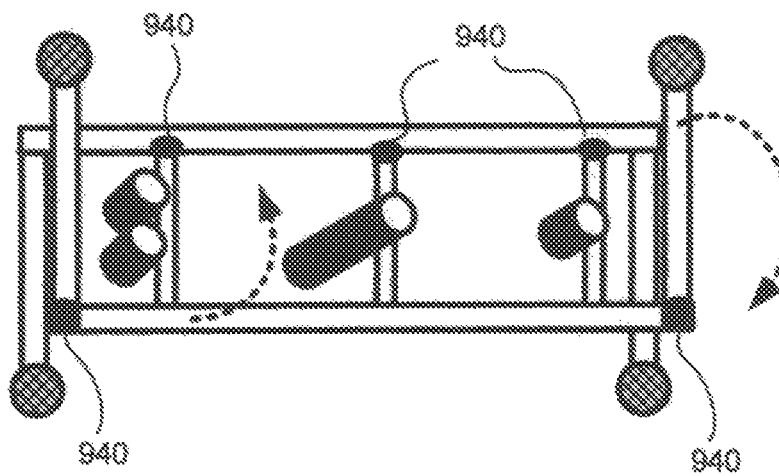

FIGS. 9A-B are illustrations of a compact/closed appearance of various exemplary platforms that are designed to "fold out" or expand. FIG. 9A is equivalent to the embodiment shown in FIG. 8B, wherein the tripod-like nature of the exemplary platform 850 allows it to be closed into a smaller form, for easy passage through a restricted entry way. FIG. 9B is a variation of the embodiment 700 shown in FIG. 7A, but in a closed position, with pivoting mechanisms 940 disposed at various locations on the exemplary platform. Dashed arrows are provided to show the direction of motion to allow this particular embodiment to be "opened" into its deployed mode. As mentioned earlier, various ways to "close" or fold-in are possible, depending primarily on the imagination of the designer. The examples shown in FIGS. 9A-B are provided only to show a few of many possible ways to create a smaller, compact platform. Therefore, other ways to fold, close, reduce the size of an exemplary platform may be contemplated without departing from the spirit and scope of this disclosure.

Figure 10A:
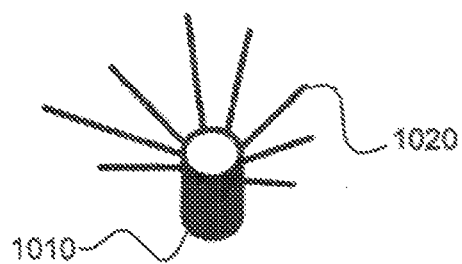
FIGS. 10A-C are illustrations of various possible sensor receptacle configurations.
Figure 10B:
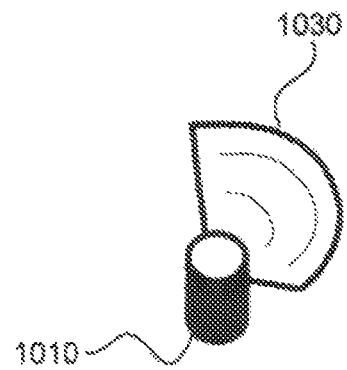
Figure 10C:
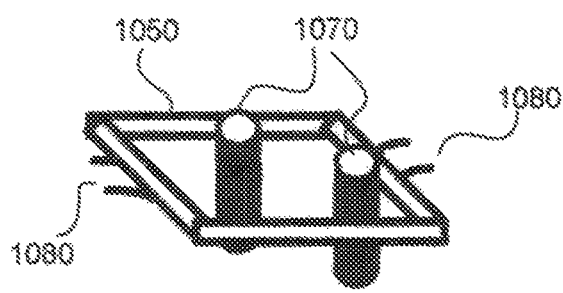

FIGS. 10A-C are illustrations of various possible sensor receptacle configurations. FIG. 10A shows a receptacle 1010 with radial arms 1020 extending conically outward to help guide into place a sensor (not shown) that may be lowered into the receptacle 1010. FIG. 10B is another example, however, one side of the receptacle 1010 is fitted with a "half" cone so that a sensor may be "dropped" thereinto and slid into the receptacle 1010. It is noted that while the above FIGS. illustrate the sensor receptacles to have a cylinder-like shape with a cavity for receiving a sensor and an outward body, any shape or arrangement may be utilized. For example, rectangular, half geometries, slots, and so forth may be utilized without departing from the spirit and scope of this disclosure.

Also, while it is understood that the receptacles can offer a "housing" for sensors to secure the sensor from movement when inserted into the receptacle, the securing mechanism may simply be a magnet or may be a locking mechanism or other form of "attachment" that enables the sensor to be secured from movement when inserted into the receptacle. Therefore, the "housing" may not need to encompass the respective sensor, but only operate to "attach" itself to the sensor to prevent the sensor from moving, once attached. Accordingly, non-sleeve-like receptacles may be used, having for example, a fin that mates with the sensor or other type of mating system. Understanding that the typical sensor will be downward facing, the receptacle can have a transparent bottom section, enabling the sensor's detector to downwardly directly without being obstructed. In some embodiments, the receptacle can simply be a hollow cylinder with a supporting ring inside the receptacle's cavity to prevent an inserted sensor from slipping entirely through the receptacle.

Some examples of possible sensors that would be well suited for a use in an underground environment are: ultrasonic level, float/tilt switches, radar level, optical/IR level, gas monitoring (e.g. $H_2S$, methane, hydrocarbons, chlorine, ozone, $CO_2$, tritium, etc.), particulate, chemical, water quality monitoring (e.g. turbidity, pH, BOD, particle count, etc.), radiation monitoring, pressure, electrical current or voltage, etc. It should be apparent that while this list is very long, it is not exhaustive and only is provided to demonstrate the endless variety of possible sensors that can be utilized with the receptacles of the exemplary sensor platform(s) described herein, the field of use being more than simply within the sewer industry.

In regard to the size of the receptacle, it may vary depending on the type and size of sensor being placed "into" it, for example. For the sewer industry, a typical sensor may be a cylindrical ultrasonic sensor having a width that is less than 3 inches and a height that is less than 4 inches. Of course, depending on the sensor's dimensions, the sizes may vary, for example, some sensors are known to be nearly one foot long. Therefore, while the receptacles shown herein are generally cylindrical in shape, any shape and any size may be utilized without departing from the spirit and scope of this disclosure.

FIG. 10C is an illustration of a "tray" of receptacles 1070 attached to supports 1050 that are connected together. Some form of securing the tray to a cavity, formed in the exemplary platform (see FIG. 8A, for example), can be accommodated for by prongs (hooks, inserts, etc.) 1080 that extend to fit over members in an exemplary platform (see FIG. 8A's members 820 and 830, for example). FIG. 10C's example is a very simple example, showing one of many, many possible ways to modularize an installation procedure for an exemplary platform. For example, a tray may be triangular, or stacked, or any various thereof. Thus, one of ordinary skill in the art, having understood the intent of FIG. 10C's purpose, may devise other modular/traying schemes without departing from the spirit and scope of this disclosure.

Figure 10D:
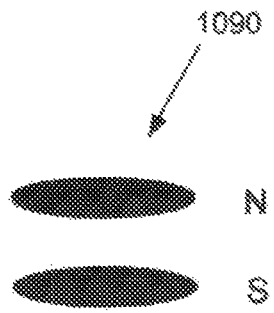
FIG. 10D is an illustration of a simple magnetic North-to-South pole magnet latching scheme.

For example, FIG. 10D illustrates a simple magnetic North-to-South pole magnet 1090. Such a system may be used to "latch" the tray of FIG. 10C to an exemplary platform, the platform having one type of magnet and the tray having the opposite type of magnet (or metal). Further, it may be desirable to use the magnetic latching/coupling capability to secure sensors to receptacles. That is, a sensor may be "latched" into a receptacle having an opposite magnet (or metal). Thus, the capability of a magnet to latch-to and release-from can be used in various forms in the exemplary embodiments.

Based on the examples described above, it should be evident that the exemplary embodiments obviate many of the difficulties of the prior art in that they enable a device or sensor to be efficiently "secured" within an enclosure without requiring human entry into the enclosure, via the use of a sensor platform that is lowered therein. The ability to use an exemplary platform is independent of whether the enclosure is large enough for human entry and therefore may be used for enclosures that are not related to the sewer industry. It is noted that the exemplary embodiments not only provide a platform for securing sensors, but the platform is designed to remain fixed when finally deployed, either through friction (i.e., gravity) or through some means of "wedging."

Due to the ability of some of the exemplary platforms to be "foldable," they can be stored in a "folded" shape, allowing for compact storage; and they can be shipped in a "folded" state, allowing for easy, more cost-effective shipping. In some embodiments, the exemplary platform may come in several pieces, only requiring easy assembly. As alluded above, several exemplary platforms (similar to FIGS. 7A-B) have been fabricated using PVC pipes which are inexpensive and environmentally resistant. It is believed that such exemplary embodiments and variations thereof will significantly reduce sensor deployment-related costs, injuries, and service times.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A sensor stabilization platform for placement at the bottom of a vertical enclosure, comprising:
    substantially vertical leg members;
    substantially horizontal support members, at least one of the support members being coupled to a top portion of the leg members, wherein the support members form an upper portion of the platform, the leg members forming a lower portion of the platform and an unobstructed opening beneath the upper portion of the platform;
    a sensor receptacle, having an upper opening, coupled to the upper portion of the platform and disposed above the unobstructed opening, with a securing mechanism configured to secure a removable sensor inserted into the top of the receptacle, the receptacle configured to allow the inserted sensor to operate without interference from the receptacle;
    at least one height adjuster coupled to at least one of the leg members, allowing leveling of the upper portion of the platform; and
    a ballast attached to the platform to prevent movement of the platform when finally resting at the bottom of the vertical enclosure,
    wherein the platform is constructed from an environmentally resistant material.

2. The apparatus of claim 1, wherein the vertical enclosure is a manhole.

3. The apparatus of claim 1, wherein the coupling of the support member to the top portion of the leg members is a pivot, the pivot automatically and fully expanding the pivot-coupled elements into a deployed state when released from a non-deployed state, wherein the deployed state is larger in size than a non-deployed state.

4. The apparatus of claim 3, wherein the pivot is configured to be opened by a spring or by gravity.

5. The apparatus of claim 1, wherein the height adjuster is fixed to a bottom of at least one of the leg members.

6. The apparatus of claim 1, wherein the ballast is at least one of sand, concrete, metal, or stone inserted into at least one of the leg members, the at least one of the leg members being hollow.

7. The apparatus of claim 1, wherein the sensor is secured to the receptacle via a magnet.

8. The apparatus of claim 1, further comprising a sensor-to-receptacle guide above the receptacle, to assist in guiding a sensor to be secured by the securing mechanism.

9. The apparatus of claim 1, wherein the leg members are constructed of PVC and have a length that is between eight inches and four feet.

10. The apparatus of claim 1, wherein a size of the receptacle is less than four inches in diameter and less than twelve inches in length.

11. The apparatus of claim 1, further comprising at least one of a power generator, an ultrasonic level sensor, float/tilt sensor, radar level sensor, optical/IR level sensor, gas monitoring sensor, chemical sensor, particulate sensor, water quality monitoring sensor, radiation monitoring sensor, pressure sensor, and electrical current/voltage sensor.

12. The apparatus of claim 11, further comprising a communications cable connected to a top portion of the sensor and suspended above the sensor.

* * * * *